(12) United States Patent
Zhang et al.

(10) Patent No.: US 11,381,378 B2
(45) Date of Patent: Jul. 5, 2022

(54) CHAOTIC COMMUNICATION METHOD AND SYSTEM BASED ON COMPLEX MODIFIED PROJECTIVE DIFFERENCE FUNCTION SYNCHRONIZATION

(71) Applicants: Qilu University of Technology, Shandong (CN); Shandong Institute of Artificial Intelligence, Shandong (CN)

(72) Inventors: Fangfang Zhang, Shandong (CN); Minglei Shu, Shandong (CN); Kai Sun, Shandong (CN); Mingming Huang, Shandong (CN); Xue Zhang, Shandong (CN)

(73) Assignees: Qilu University of Technology, Jinan (CN); Shandong Institute of Artificial Intelligence, Jinan (CN)

( * ) Notice: Subject to any disclaimer, the term of this patent is extended or adjusted under 35 U.S.C. 154(b) by 15 days.

(21) Appl. No.: 17/038,143

(22) Filed: Sep. 30, 2020

(65) Prior Publication Data

US 2022/0045838 A1 Feb. 10, 2022

(30) Foreign Application Priority Data

Aug. 6, 2020 (CN) .......................... 202010781255.1

(51) Int. Cl.
*H04L 9/00* (2022.01)
*H04L 27/00* (2006.01)

(52) U.S. Cl.
CPC ............ *H04L 9/001* (2013.01); *H04L 27/001* (2013.01)

(58) Field of Classification Search
CPC . H04L 9/001; H04L 9/00; H04L 9/002; H04L 9/06; H04L 27/001
See application file for complete search history.

(56) References Cited

U.S. PATENT DOCUMENTS 5,479,513 A * 12/1995 Protopopescu ......... H04L 9/001
380/259
5,751,811 A * 5/1998 Magnotti ................ H04L 9/001
380/28

(Continued)

*Primary Examiner* — Hosuk Song
(74) *Attorney, Agent, or Firm* — Young Basile Hanlon & MacFarlane, P.C.

(57) ABSTRACT

According to the chaotic communication method and system based on complex modified projective difference function synchronization provided in the present invention, when a chaotic signal has a relatively small amplitude, the amplitude of the chaotic signal can be adjusted by adjusting a proportional matrix, so as to mask plaintext better. Moreover, a robust controller is designed according to a filtered signal and a second coupling function, to ensure complex modified projective difference function synchronization, and such synchronization allows the bit error rate to be zero theoretically. In addition, complex modified projective difference function synchronization does not require a transmitter and a receiver to be exactly consistent, provided that the synchronization can be implemented under the effect of the controller, thereby solving the disadvantage in the prior art that the receiver system and transmitter system are required to have exactly identical structures, and simplifying a structure requirement on the communication system.

8 Claims, 2 Drawing Sheets

(56) References Cited

U.S. PATENT DOCUMENTS

| | | | | |
|---|---|---|---|---|
| 5,857,025 A | * | 1/1999 | Anderson | H04L 9/16 380/28 |
| 6,704,420 B1 | * | 3/2004 | Goedgebuer | H04B 10/85 380/256 |
| 7,366,299 B2 | * | 4/2008 | Cheung | H04L 9/00 380/263 |
| 8,144,872 B2 | * | 3/2012 | Hu | H04K 1/025 380/263 |
| 9,600,238 B2 | * | 3/2017 | Radwan | G06F 7/588 |

* cited by examiner

CHAOTIC COMMUNICATION METHOD AND SYSTEM BASED ON COMPLEX MODIFIED PROJECTIVE DIFFERENCE FUNCTION SYNCHRONIZATION

CROSS-REFERENCE TO RELATED APPLICATION(S)

This application claims priority to Chinese Application Patent Serial No. 202010781255.1, filed Aug. 6, 2020, the entire disclosure of which is hereby incorporated by reference.

TECHNICAL FIELD

The present invention relates to the field of communications, and in particular, to a chaotic communication method and system based on complex modified projective difference function synchronization.

BACKGROUND

Conventional chaotic communication requires the amplitude of a chaotic signal to be much higher than the amplitude of an information signal (plaintext) and the amplitude of noise, so that information can be completely masked. When the information signal (plaintext) has a relatively high amplitude, common chaotic signal generators are of limited types and output a fixed amplitude, thus failing to completely mask the plaintext.

In addition, signals restored in chaotic communication based on complete synchronization generally carry a certain noise error, and it is difficult to completely eliminate noise through filtering. Meanwhile, complete synchronization further requires a receiver system and a transmitter system to have exactly identical structures. Since the transmitter drive system and the receiver response system are located in different environments, the two systems can hardly be maintained precisely consistent. Due to the foregoing two reasons, theoretically, the bit error rate (BER) of the chaotic communication based on complete synchronization is not zero.

Therefore, to provide a communication method or system that can theoretically obtain zero BER is a technical problem to be solved urgently in the field.

SUMMARY

An objective of the present invention is to provide a chaotic communication method and system based on complex modified projective difference function synchronization, to solve the problem in the prior art that the bit error rate cannot be zero theoretically.

To achieve the above purpose, the present invention provides the following technical solutions.

A chaotic communication method based on complex modified projective difference function synchronization includes:

obtaining an information signal, a proportional matrix, and a first coupling function and a second coupling function of a coupled complex chaotic system under control, where the first coupling function is a derivative equation of a first complex state vector in a chaos equation of a drive system; the second coupling function is a derivative equation of a first complex state vector in a chaos equation of a response system; the proportional matrix is a private key shared by the drive system and the response system; the information signal is H(t): H(t)={$h_1(t)$, $h_2(t)$, ..., $h_q(t)$}$^T$, where $h_1(t)$, $h_2(t)$, ..., $h_q(t)$ are all factors of a difference function, and q is the number of the factors;

determining a transmission signal according to the information signal, the proportional matrix and the first coupling function by using an encryptor;

forming an actual transmission signal after adding noise in a process of transmitting the transmission signal in a channel;

obtaining a filtered signal according to the actual transmission signal by using a filter;

determining a controller according to the filtered signal and the second coupling function, the controller being v: v=s''−f(x,z)+ke;

where s' represents a filtered transmission signal of the response system; f(x,z) represents the second coupling function; k is a real number less than zero; e=x(t)−$\int_0^t$sdt, x(t) represents the first complex state vector in the chaos equation of the response system, s represents the transmission signal, and t represents a communication time;

reconstructing the first complex state vector in the chaos equation of the response system according to the second complex state vector in the chaos equation of the drive system by using the controller, to obtain a reconstructed complex state vector;

performing decryption according to the reconstructed complex state vector, the proportional matrix, and the first complex state vector in the chaos equation of the drive system by using a decryptor, to obtain the information signal.

Preferably, a squared error of the first complex state vector in the chaos equation of the response system, the first complex state vector and the proportional matrix in the chaos equation of the drive system, and the information signal is zero.

Preferably, the coupled complex chaotic system under control is:

$$L1: \begin{cases} \dot{y} = g(y, z) \\ \dot{z} = p(y, z) \end{cases}$$

$$L2: \dot{x} = f(x, z) + v;$$

where L1 represents the drive system; L2 represents the response system; $\dot{y}$ represents a derivative of the first complex state vector of the drive system; g(y,z) represents the first coupling function; $\dot{z}$ represents a derivative of a second complex state vector of the drive system; p(y,z) represents a third coupling function; $\dot{x}$ represents a derivative of the first complex state vector of the response system; f(x,z) represents the second coupling function; v represents a control signal; x represents the first complex state vector of the response system, y represents the first complex state vector of the drive system, and z represents a second complex state vector of the drive system.

Preferably, the reconstructing the first complex state vector in the chaos equation of the response system according to the second complex state vector in the chaos equation of the drive system by using the controller, to obtain a reconstructed complex state vector specifically includes:

obtaining a filtered second complex state vector according to the second complex state vector in the chaos equation of the drive system by using a filter; and reconstructing the first complex state vector in the chaos equation of the response system according to the filtered second complex state vector by using the controller, to obtain a reconstructed complex state vector.

Preferably, the performing decryption according to the reconstructed complex state vector, the proportional matrix, and the first complex state vector in the chaos equation of the drive system by using a decryptor, to obtain the information signal specifically includes:

obtaining a filtered first complex state vector according to the first complex state vector in the chaos equation of the drive system by using a filter; and performing decryption according to the reconstructed complex state vector, the proportional matrix and the filtered first complex state vector by using the decryptor, to obtain the information signal.

A chaotic communication system based on complex modified projective difference function synchronization includes:

an obtaining module, configured to obtain an information signal, a proportional matrix, and a first coupling function and a second coupling function of a coupled complex chaotic system under control, where the first coupling function is a derivative equation of a first complex state vector in a chaos equation of a drive system; the second coupling function is a derivative equation of a first complex state vector in a chaos equation of a response system; and the proportional matrix is a private key shared by the drive system and the response system;

a transmission signal determining module, configured to determine a transmission signal according to the information signal, the proportional matrix and the first coupling function by using an encryptor;

an actual transmission signal determining module, configured to form an actual transmission signal after adding noise in a process of transmitting the transmission signal in a channel;

a filtered signal determining module, configured to obtain a filtered signal according to the actual transmission signal by using a filter;

a controller determining module, configured to determine a controller according to the filtered signal and the second coupling function, the controller being v: v=s''−f(x,z)+ke;

where s' represents a filtered transmission signal of the response system; f(x,z) represents the second coupling function; k is a real number less than zero; e=x(t)−$\int_0^t$s'dt, x(t) represents the first complex state vector in the chaos equation of the response system, s represents the transmission signal, and t represents a communication time;

a complex state vector reconstruction module, configured to reconstruct the first complex state vector in the chaos equation of the response system according to the second complex state vector in the chaos equation of the drive system by using the controller, to obtain a reconstructed complex state vector; and an information signal decryption module, configured to perform decryption according to the reconstructed complex state vector, the proportional matrix, and the first complex state vector in the chaos equation of the drive system by using a decryptor, to obtain the information signal.

Preferably, the complex state vector reconstruction module specifically includes:

a first filtering unit, configured to obtain a filtered second complex state vector according to the second complex state vector in the chaos equation of the drive system by using a filter; and a complex state vector reconstruction unit, configured to reconstruct the first complex state vector in the chaos equation of the response system according to the filtered second complex state vector by using the controller, to obtain the reconstructed complex state vector.

Preferably, the information signal decryption module specifically includes:

a second filtering unit, configured to obtain a filtered first complex state vector according to the first complex state vector in the chaos equation of first drive system by using a filter; and an information signal decryption unit, configured to perform decryption according to the reconstructed complex state vector, the proportional matrix and the filtered first complex state vector by using the decryptor, to obtain the information signal.

According to the embodiments of the present invention, the present invention has the following technical effects.

According to the chaotic communication method and system based on complex modified projective difference function synchronization provided in the present invention, when a chaotic signal has a relatively small amplitude, the amplitude of the chaotic signal can be adjusted by adjusting a proportional matrix, so as to mask plaintext better. Moreover, a robust controller is designed according to a filtered signal and a second coupling function, to ensure complex modified projective difference function synchronization, and such synchronization allows the bit error rate to be zero theoretically. In addition, complex modified projective difference function synchronization does not require a transmitter and a receiver to be exactly consistent, provided that complex modified projective difference function synchronization can be implemented under the effect of the controller, thereby solving the disadvantage in the prior art that the receiver system and transmitter system are required to have exactly identical structures, and simplifying a structure requirement on the communication system.

BRIEF DESCRIPTION OF THE DRAWINGS

In order to illustrate the embodiments of the present invention or the technical solutions of the prior art, the accompanying drawing to be used will be described briefly below. Notably, the following accompanying drawing merely illustrates some embodiments of the present invention, but other accompanying drawings can also be obtained by those of ordinary skill in the art based on the accompanying drawing without any creative efforts.

DETAILED DESCRIPTION

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a chaotic communication method and system based on complex modified projective difference function synchronization, to solve the problem in the prior art that the bit error rate cannot be zero theoretically.

To make the foregoing objective, features, and advantages of the present invention clearer and more comprehensible, the present invention is further described in detail below with reference to the accompanying drawings and specific embodiments.

Figure 1:
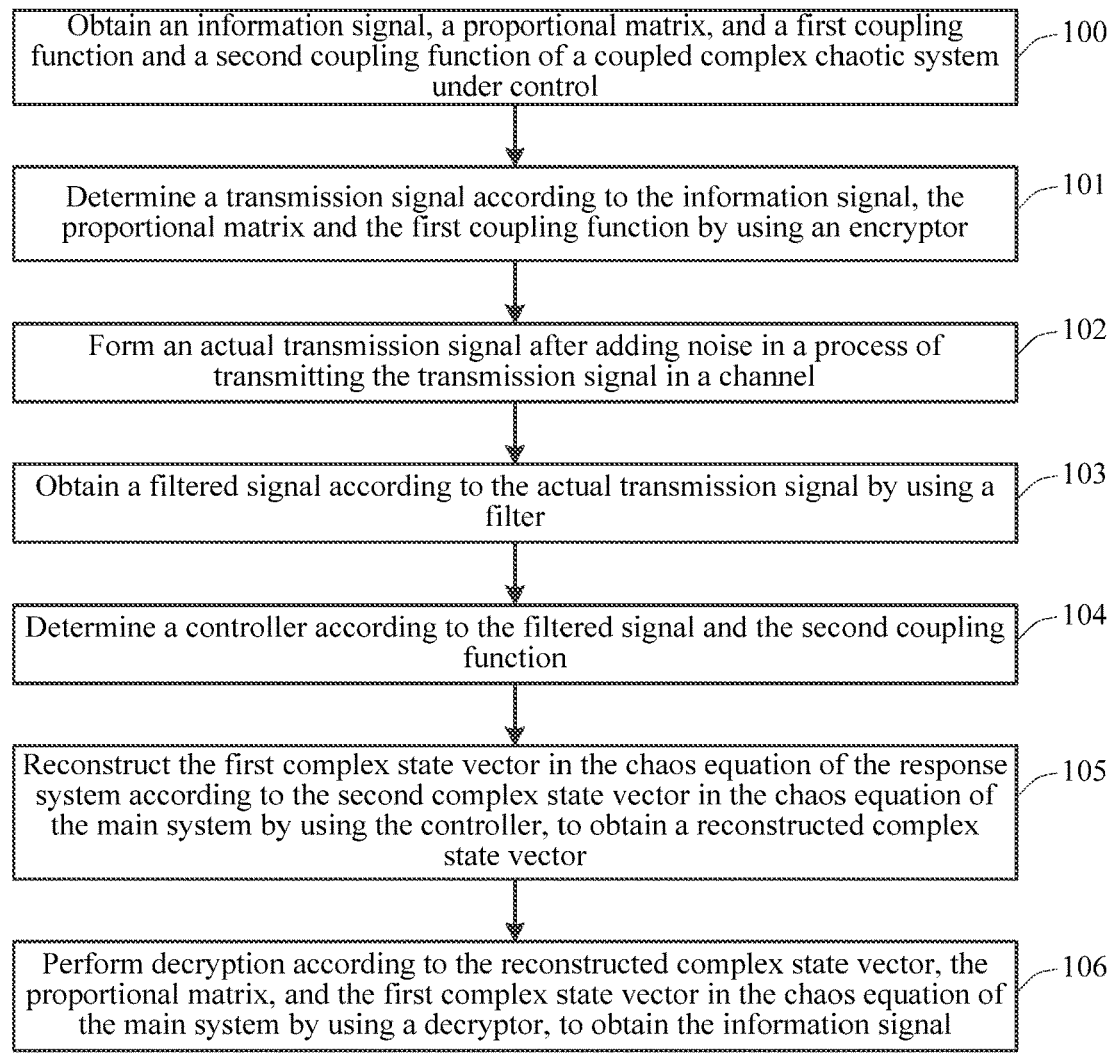
FIG. 1 is a flowchart of a chaotic communication method based on complex modified projective difference function synchronization according to the present invention.

FIG. 1 is a flowchart of a chaotic communication method based on complex modified projective difference function synchronization according to the present invention. As shown in FIG. 1, a chaotic communication method based on complex modified projective difference function synchronization includes the following steps:

Step 100: obtain an information signal, a proportional matrix, and a first coupling function and a second coupling function of a coupled complex chaotic system under control. The first coupling function is a derivative equation of a first complex state vector in a chaos equation of a drive system. The second coupling function is a derivative equation of a first complex state vector in a chaos equation of a response system. The proportional matrix is a private key shared by the drive system and the response system. The information signal is H(t): $H(t)=\{h_1(t), h_2(t), \ldots, h_q(t)\}^T$, where $h_1(t)$, $h_2(t), \ldots, h_q(t)$ are all factors of a difference function, and q is the number of the factors.

The coupled complex chaotic system under control is expressed with an n-dimension difference equation as follows:

$$L1: \begin{cases} \dot{y} = g(y, z) \\ \dot{z} = p(y, z) \end{cases} \quad (1)$$

$$L2: \dot{x} = f(x, z) + v$$

L1 represents the drive system; L2 represents the response system; $\dot{y}$ represents a derivative of the first complex state vector of the drive system; g(y,z) represents the first coupling function; $\dot{z}$ represents a derivative of a second complex state vector of the drive system; p(y,z) represents a third coupling function; $\dot{x}$ represents a derivative of the first complex state vector of the response system; f(x,z) represents the second coupling function; v represents a control signal; x represents the first complex state vector of the response system, y represents the first complex state vector of the drive system, and z represents a second complex state vector of the drive system; $y=(y_1, y_2, \ldots, y_q)^T$ and $z=(z_1, z_2, \ldots, z_{n-q})^T$, where y and z are observable; the complex state vector z is a coupled vector; $v=v'+jv'$, $v^r=(v_1^r, v_2^r, \ldots, v_n^r)^T$, and $v=(v_1^i, v_2^i, \ldots, v_n^i)^T$. g(y,z), p(y,z) and f(x,z) are separately used for describing variations of the complex state vectors x,y,z over time.

To implement complex modified projective difference function synchronization, it needs to ensure that a squared error of the first complex state vector in the chaos equation of the response system, the first complex state vector and the proportional matrix in the chaos equation of the drive system, and the information signal meets the following condition:

$$\lim_{t \to +\infty} \|e(t)\|^2 = \lim_{t \to +\infty} \|x(t) - H(t) - Dy(t)\|^2 = \quad (2)$$

$$\lim_{t \to +\infty} (\|x^r(t) - H^r(t) - D^r y^r(t) + D^i y^i(t)\|^2 +$$

$$\|x^i(t) - H^i(t) - D^r y^i(t) + D^i y^r(t)\|^2) = 0$$

In the equation, $\|\square\|$ represents a Euclidean norm; $H(t)=\{h_1(t), h_2(t), \ldots, h_q(t)\}^T$ represents the information signal, which is a bounded vector; $h_1(t)$, $h_2(t), \ldots, h_q(t)$ represent factors of the difference function; $h_f(t):C \to C(l=1, 2, \ldots, p)$ represents a bounded complex function; the proportional matrix $D=\text{diag}\{d_1, d_2, \ldots, d_n\}$, $d_f \in C$ is a bounded complex number.

The foregoing condition is applied to a practical solution, where y(t) represents a complex chaotic variable in the drive system, and is used for chaotic masking and generating ciphertext. x(t) represents a reconstructed complex chaotic variable in the response system, H(t) represents an information signal vector, namely, plaintext, and D represents the proportional matrix.

Step 101: determine a transmission signal according to the information signal, the proportional matrix and the first coupling function by using an encryptor.

Step 102: form an actual transmission signal after adding noise in a process of transmitting the transmission signal in a channel.

Step 103: obtain a filtered signal according to the actual transmission signal by using a filter.

Step 104: determine a controller according to the filtered signal and the second coupling function.

According to the definition of complex modified projective difference function synchronization, a synchronization error may be obtained as follows:

$$e(t)=x(t)-H(t)-Dy(t) \quad (3)$$

By separately simplifying e(t), x(t), H(t) and y(t) to be e, x, H and y, a derivative of the error may be obtained as follows:

$$\dot{e} = \dot{x} - \dot{H} - D\dot{y} \quad (4)$$

$$= f(x, z) + v - \dot{H} - Dg(y, z)$$

$$= f(x, z) + v - s$$

In the formula, $s=\dot{H}+Dg(y,z)$, and s is a transmission signal s(t) outputted by the transmitter.

When different complex state vectors x, y, z outputted by the chaotic system are all observable and controllable, according to the principle of active control, the controller is designed as follows:

$$v = s'' - f(x, z) + ke \quad (5)$$

$$= s'' - f(x, z) + k\left(x(t) - \int_0^t s dt\right)$$

In the formula, k represents control intensity, f(x,z) represents the second coupling function, s" represents the transmission signal obtained after filtering by the filter, which is approximate to s(t), and t represents a communication time.

By substituting formula (5) into formula (4), the error of the master-slave system is controlled by the controller v, to obtain ė=ke. According to the Lyapunov's theorem, as long as k<0, the synchronization of the complex modified projective difference function of the master-slave system is implemented.

Step 105: reconstruct the first complex state vector in the chaos equation of the response system according to the second complex state vector in the chaos equation of the drive system by using the controller, to obtain a reconstructed complex state vector.

To improve the accuracy of signal reconstruction, step 105 may specifically include:

obtaining a filtered second complex state vector according to the second complex state vector in the chaos equation of the drive system by using a filter; and reconstructing the first complex state vector in the chaos equation of the response system according to the filtered second complex state vector by using the controller, to obtain the reconstructed complex state vector.

Step 106: perform decryption according to the reconstructed complex state vector, the proportional matrix, and the first complex state vector in the chaos equation of the drive system by using a decryptor, to obtain the information signal.

Further, to improve the accuracy of signal reconstruction, in step 106, the first complex state vector in the chaos equation of the drive system may also be filtered by using a filter to obtain a filtered first complex state vector. Then, decryption is performed according to the reconstructed complex state vector, the proportional matrix and the filtered first complex state vector by using the decryptor, to obtain the information signal.

Figure 2:
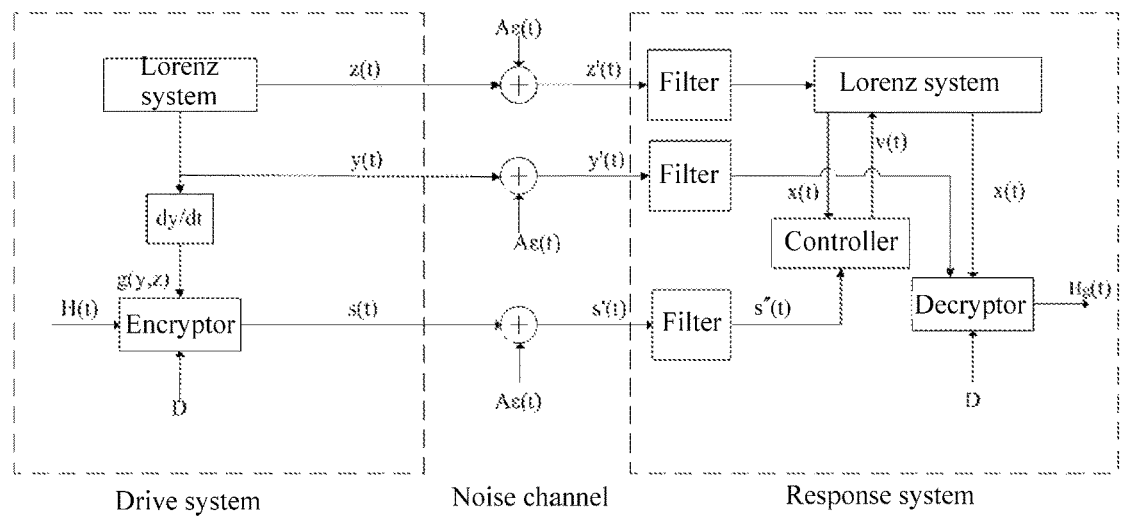
FIG. 2 is a diagram of a communication framework according to an embodiment of the present invention.

According to the definition and idea of the synchronization of the complex modified projective difference function as shown in formula (2), by applying the coupled complex chaotic system under control to the communication method provided in the present invention, the communication framework shown in FIG. 2 can be constructed.

A chaotic communication process carried out by using the chaotic communication method provided in the present invention is described in detail below based on the communication framework shown in FIG. 2.

Step 1: start communication.

With an initial value of a coupled signal, a request signal z(0) is sent to a receiver, to request information transmission and construction of a decryption system. After receiving the signal z(0) sent by the transmitter, the receiver returns z(0) to the transmitter. The transmitter compares the sent and received signals. If the signals are consistent, the transmitter starts to encrypt information. If the signals are inconsistent, the foregoing operations are repeated, until the signals are consistent.

Step 2: encrypt and transmit information.

At the transmitter (drive system), an information signal vector $H(t)=\{h_1(t), h_2(t), \ldots, h_q(t)\}^T$ (plaintext), a proportional matrix D (private key), and a coupling function g(y, z) in a Lorenz system (coupled complex chaotic system under control) are all transmitted to an encryptor as inputs. The encryptor superposes amplitudes of the three inputted signals, that is, the information signal H(t) is masked by using the amplitudes of the proportional matrix D and the chaotic signal g(y, z), so that characteristics of the information signal are hidden in a newly generated signal. After superposition, the encryptor correspondingly outputs s(t) as a transmission signal to be transmitted in a channel, that is, s(t)=H(t)+Dg(y,z). During transmission, noise Aε is added to the transmission signal s(t) to form an actual transmission signal s'(t), that is, s'(t)=s(t)+Aε=H+Dg(y,z)+Aε. Aε represents a noise signal (Aε(t) in FIG. 2) generated in the channel, and A represents the amplitude of the noise.

Step 3: perform synchronization and decryption at a receiver by using a controller.

At the receiver (response system), the noise Aε(t) in the transmission signal s' is first filtered to obtain a signal s", and s" is approximate to s(t). Then, a controller v=s"−f(x,z)+ke is designed, where $e=x(t)-\int_0^t sdt$. Finally, during implementation of the synchronization of the complex modified projective difference function, x(t) and H(t)+Dy(t) occur simultaneously, and the information signal H(t)=x(t)−Dy(t) can be restored, thus implementing decryption of the information, to obtain a decrypted information signal $H_g(t)$. In this process, x(t) is essentially a complex state vector x reconstructed by using the complex vector controller v.

The controller v is designed according to formula (5), to implement the synchronization of the complex modified projective difference function.

Figure 3:
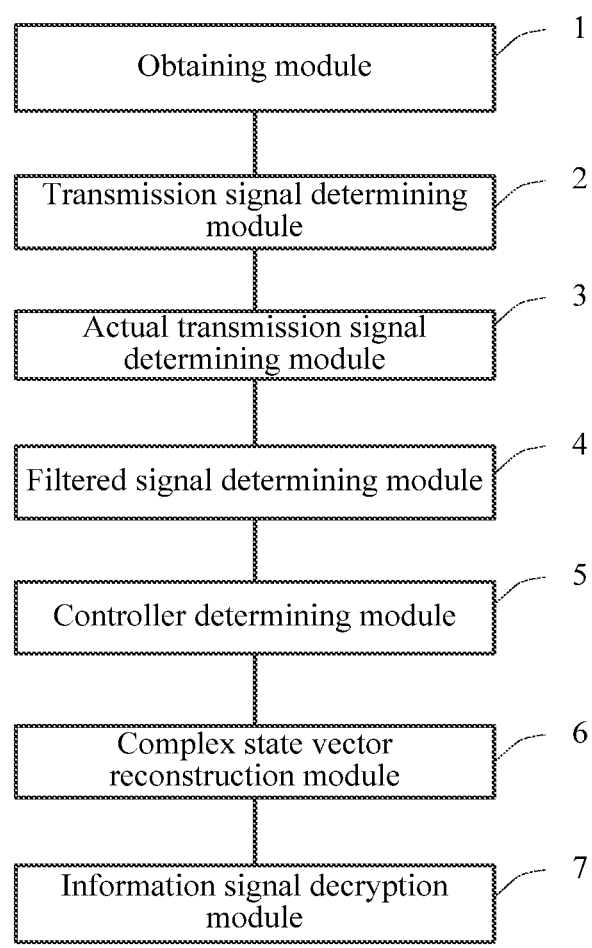
FIG. 3 is a schematic structural diagram of a chaotic communication system based on complex modified projective difference function synchronization according to the present invention.

Corresponding to the chaotic communication method based on complex modified projective difference function synchronization, the present invention further provides a chaotic communication system based on complex modified projective difference function synchronization. As shown in FIG. 3, the chaotic communication system includes: an obtaining module 1, a transmission signal determining module 2, an actual transmission signal determining module 3, a filtered signal determining module 4, a controller determining module 5, a complex state vector reconstruction module 6, and an information signal decryption module 7.

The obtaining module 1 is configured obtain an information signal, a proportional matrix, and a first coupling function and a second coupling function of a coupled complex chaotic system under control. The first coupling function is a derivative equation of a first complex state vector in a chaos equation of a drive system. The second coupling function is a derivative equation of a first complex state vector in a chaos equation of a response system. The proportional matrix is a private key shared by the drive system and the response system.

The transmission signal determining module 2 is configured to determine a transmission signal according to the information signal, the proportional matrix and the first coupling function by using an encryptor.

The actual transmission signal determining module 3 is configured to form an actual transmission signal after adding noise in a process of transmitting the transmission signal in a channel.

The filtered signal determining module 4 is configured to obtain a filtered signal according to the actual transmission signal by using a filter.

The controller determining module 5 is configured to determine a controller according to the filtered signal and the second coupling function. The controller is v: v=s"−f(x,z)+ke.

s represents a filtered transmission signal of the response system; f(x,z) represents the second coupling function; k is a real number less than zero; $e=x(t)-\int_0^t sdt$, where x(t) represents the first complex state vector in the chaos equation of the response system, s represents the transmission signal, and t represents a communication time.

The complex state vector reconstruction module 6 is configured to reconstruct the first complex state vector in the chaos equation of the response system according to the second complex state vector in the chaos equation of the drive system by using the controller, to obtain a reconstructed complex state vector.

The information signal decryption module 7 is configured to perform decryption according to the reconstructed complex state vector, the proportional matrix, and the first complex state vector in the chaos equation of the drive system by using a decryptor, to obtain the information signal.

In a preferred embodiment of the present invention, the complex state vector reconstruction module 6 specifically includes: a first filtering unit and a complex state vector reconstruction unit.

The first filtering unit is configured to obtain a filtered second complex state vector according to the second complex state vector in the chaos equation of the drive system by using a filter.

The complex state vector reconstruction unit is configured to reconstruct the first complex state vector in the chaos equation of the response system according to the filtered second complex state vector by using the controller, to obtain the reconstructed complex state vector.

In a preferred embodiment of the present invention, the information signal decryption module 7 specifically includes: a second filtering unit and an information signal decryption unit.

The second filtering unit is configured to obtain a filtered first complex state vector according to the first complex state vector in the chaos equation of first drive system by using a filter.

The information signal decryption unit is configured to perform decryption according to the reconstructed complex state vector, the proportional matrix and the filtered first complex state vector by using the decryptor, to obtain the information signal.

Compared with the prior art, the chaotic communication method and system based on complex modified projective difference function synchronization according to the present invention further achieve the following advantages:

1. The precision of the information signal (plaintext) decrypted by the receiver is improved, and the bit error rate is theoretically 0 with ideal filters.

2. Chaotic masking requires the amplitude of the chaotic signal to be much higher than the amplitude of the information signal (plaintext) and the channel noise, and this problem is resolved in this solution. When the chaotic signal has a relatively small amplitude, the proportional matrix D is used, so that the amplitude of the chaotic signal can be adjusted randomly, to achieve better chaotic masking for the plaintext signal.

3. This communication method uses chaotic encryption, chaotic masking and noise masking to improve security of information transmission.

4. The actual transmission signal is a complex variable signal, which is at least twice as secure as a real variable, and two information signals can be transmitted simultaneously through a real part and an imaginary part. Moreover, the transmitter can select a certain state variable randomly, thereby expanding the range of application.

5. The synchronization of the complex modified projective difference function can be implemented between different transmitters and receivers, and does not require structures of the transmitter and the receiver to be absolutely identical, thus simplifying the structure requirement on the system.

Each embodiment of the present specification is described in a progressive manner, each embodiment focuses on the difference from other embodiments, and the same and similar parts between the embodiments may refer to each other. For the system disclosed in the embodiments, since the system corresponds to the method disclosed in the embodiments, the description is relatively simple, and reference can be made to the method description.

In this specification, several specific embodiments are used for illustration of the principles and implementations of the present invention. The description of the foregoing embodiments is used to help illustrate the method of the present invention and the core ideas thereof. In addition, those of ordinary skill in the art can make various modifications in terms of specific implementations and scope of application in accordance with the ideas of the present invention. In conclusion, the content of this specification shall not be construed as a limitation to the present invention.

What is claimed is:

1. A chaotic communication method based on complex modified projective difference function synchronization, comprising:

obtaining an information signal, a proportional matrix, and a first coupling function and a second coupling function of a coupled complex chaotic system under control, wherein the first coupling function is a derivative equation of a first complex state vector in a chaos equation of a drive system; the second coupling function is a derivative equation of a first complex state vector in a chaos equation of a response system; the proportional matrix is a private key shared by the drive system and the response system; the information signal is $H(t)$: $H(t)=\{h_1(t), h_2(t), \ldots, h_q(t)\}^T$, wherein $h_1(t)$, $h_2(t), \ldots, h_q(t)$ are all factors of a difference function, and q is a number of the factors;

determining a transmission signal according to the information signal, the proportional matrix and the first coupling function by using an encryptor;

forming an actual transmission signal after adding noise in a process of transmitting the transmission signal in a channel;

obtaining a filtered signal according to the actual transmission signal by using a filter;

determining a controller according to the filtered signal and the second coupling function, the controller being v: $v=s''-f(x,z)+ke$;

wherein $s''$ represents a filtered transmission signal of the response system; $f(x,z)$ represents the second coupling function; k is a real number less than zero; $e=x(t)-\int_0^t s\,dt$, $x(t)$ represents the first complex state vector in the chaos equation of the response system, s represents the transmission signal, and t represents a communication time;

reconstructing the first complex state vector in the chaos equation of the response system according to a second complex state vector in the chaos equation of the drive system by using the controller, to obtain a reconstructed complex state vector; and performing decryption according to the reconstructed complex state vector, the proportional matrix, and the first complex state vector in the chaos equation of the drive system by using a decryptor, to obtain the information signal.

2. The chaotic communication method based on complex modified projective difference function synchronization according to claim 1, wherein a squared error of the first complex state vector in the chaos equation of the response system, the first complex state vector and the proportional matrix in the chaos equation of the drive system, and the information signal is zero.

3. The chaotic communication method based on complex modified projective difference function synchronization according to claim 1, wherein the coupled complex chaotic system under control is:

$$L1: \begin{cases} \dot{y} = g(y, z) \\ \dot{z} = p(y, z) \end{cases}$$

$$L2: \dot{x} = f(x, z) + v;$$

wherein L1 represents the drive system; L2 represents the response system; $\dot{y}$ represents a derivative of the first complex state vector of the drive system; g(y,z) represents the first coupling function; $\dot{z}$ represents a derivative of a second complex state vector of the drive system; p(y,z) represents a third coupling function; $\dot{x}$ represents a derivative of the first complex state vector of the response system; f(x,z) represents the second coupling function; v represents a control signal; x represents the first complex state vector of the response system, y represents the first complex state vector of the drive system, and z represents a second complex state vector of the drive system.

4. The chaotic communication method based on complex modified projective difference function synchronization according to claim 1, wherein the reconstructing the first complex state vector in the chaos equation of the response system according to the second complex state vector in the chaos equation of the drive system by using the controller, to obtain a reconstructed complex state vector specifically comprises:
   obtaining a filtered second complex state vector according to the second complex state vector in the chaos equation of the drive system by using a filter; and
   reconstructing the first complex state vector in the chaos equation of the response system according to the filtered second complex state vector by using the controller, to obtain a reconstructed complex state vector.

5. The chaotic communication method based on complex modified projective difference function synchronization according to claim 1, wherein the performing decryption according to the reconstructed complex state vector, the proportional matrix, and the first complex state vector in the chaos equation of the drive system by using a decryptor, to obtain the information signal specifically comprises:
   obtaining a filtered first complex state vector according to the first complex state vector in the chaos equation of first drive system by using a filter; and
   performing decryption according to the reconstructed complex state vector, the proportional matrix and the filtered first complex state vector by using the decryptor, to obtain the information signal.

6. A chaotic communication system based on complex modified projective difference function synchronization, comprising:
   an obtaining module, configured to obtain an information signal, a proportional matrix, and a first coupling function and a second coupling function of a coupled complex chaotic system under control, wherein the first coupling function is a derivative equation of a first complex state vector in a chaos equation of a drive system; the second coupling function is a derivative equation of a first complex state vector in a chaos equation of a response system; and the proportional matrix is a private key shared by the drive system and the response system;
   a transmission signal determining module, configured to determine a transmission signal according to the information signal, the proportional matrix and the first coupling function by using an encryptor;
   an actual transmission signal determining module, configured to form an actual transmission signal after adding noise in a process of transmitting the transmission signal in a channel;
   a filtered signal determining module, configured to obtain a filtered signal according to the actual transmission signal by using a filter;
   a controller determining module, configured to determine a controller according to the filtered signal and the second coupling function, the controller being v: $v=s''-f(x,z)+ke$;
   wherein s'' represents a filtered transmission signal of the response system; f(x,z) represents the second coupling function; k is a real number less than zero; $e=x(t)-\int_0^t s\, dt$, x(t) represents the first complex state vector in the chaos equation of the response system, s represents the transmission signal, and t represents a communication time;
   a complex state vector reconstruction module, configured to reconstruct the first complex state vector in the chaos equation of the response system according to a second complex state vector in the chaos equation of the drive system by using the controller, to obtain a reconstructed complex state vector; and
   an information signal decryption module, configured to perform decryption according to the reconstructed complex state vector, the proportional matrix, and the first complex state vector in the chaos equation of the drive system by using a decryptor, to obtain the information signal.

7. The chaotic communication system based on complex modified projective difference function synchronization according to claim 6, wherein the complex state vector reconstruction module specifically comprises:
   a first filtering unit, configured to obtain a filtered second complex state vector according to the second complex state vector in the chaos equation of the drive system by using a filter; and
   a complex state vector reconstruction unit, configured to reconstruct the first complex state vector in the chaos equation of the response system according to the filtered second complex state vector by using the controller, to obtain the reconstructed complex state vector.

8. The chaotic communication system based on complex modified projective difference function synchronization according to claim 6, wherein the information signal decryption module specifically comprises:
   a second filtering unit, configured to obtain a filtered first complex state vector according to the first complex state vector in the chaos equation of first drive system by using a filter; and
   an information signal decryption unit, configured to perform decryption according to the reconstructed complex state vector, the proportional matrix and the filtered first complex state vector by using the decryptor, to obtain the information signal.

* * * * *